March 20, 1962  W. H. LEE  3,026,461
SENSING AND CONTROL CIRCUIT
Filed Oct. 27, 1959
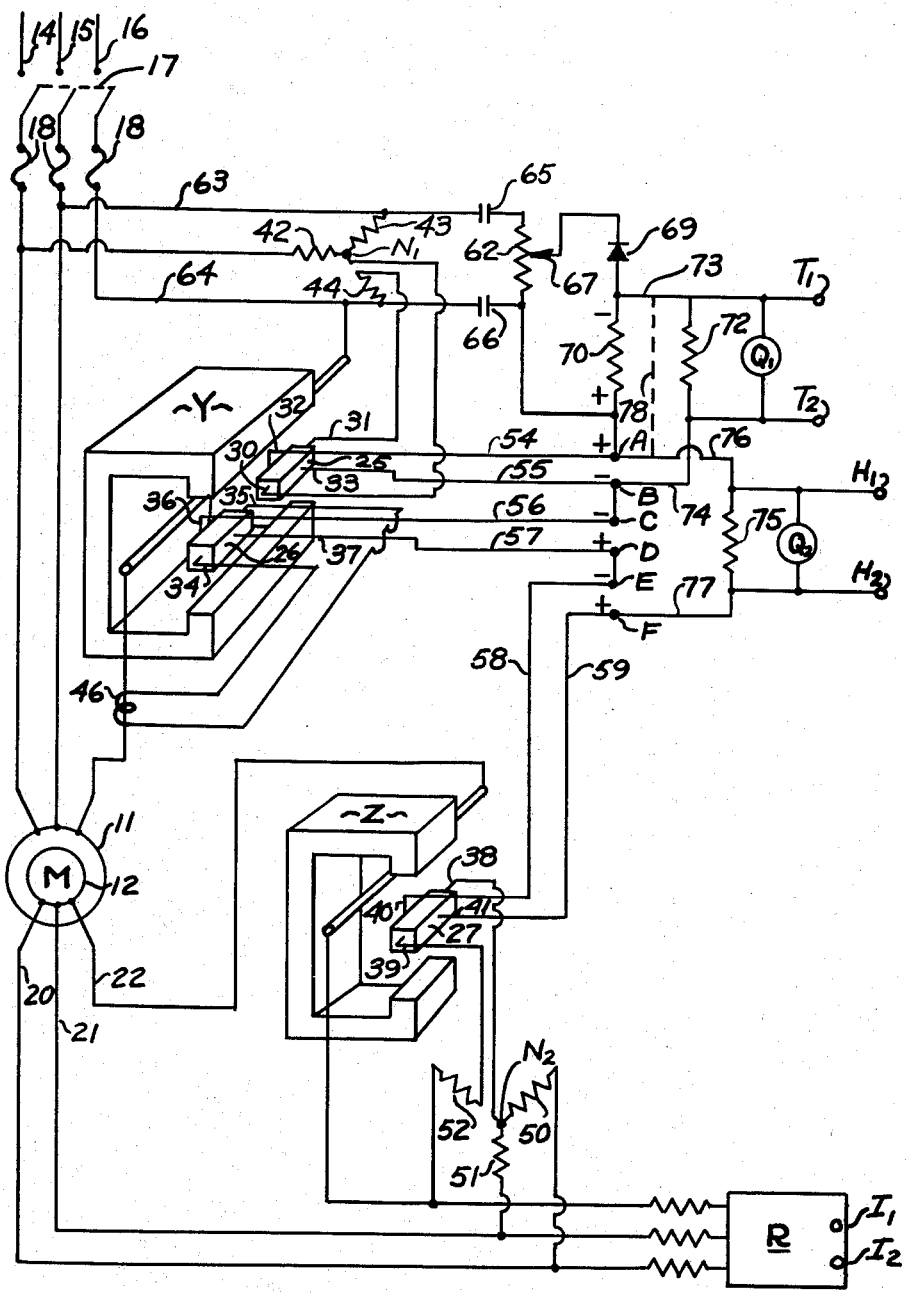
INVENTOR.
WILLIAM H. LEE
BY Bosworth, Sessions,
Herrstrom & Knowles
ATTORNEYS

United States Patent Office 3,026,461
Patented Mar. 20, 1962

3,026,461
SENSING AND CONTROL CIRCUIT
William H. Lee, Drury Lane, Waitehill Village,
R.D. 3, Willoughby, Ohio
Filed Oct. 27, 1959, Ser. No. 849,021
13 Claims. (Cl. 318—229)

This invention relates to the measuring, indicating and controlling of dynamoelectric machine performance and particularly to means for producing electrical signals proportional to various measures of dynamoelectric machine performance and which signals may be used to produce visual indications and/or control the performance of a dynamoelectric machine.

It is often desirable, for example, to be able to measure the torque or power output of an induction motor. In certain applications, such measurements become especially useful if they can be embodied in electrical signals suitable for use in controlling the motor.

For instance, an induction motor whose secondary current is controlled in accordance with an error signal derived from a signal proportional to the motor output torque and a reference signal will deliver a constant torque under varying loads and speeds. An induction motor so controlled may be used to drive a mooring winch aboard ship so that the mooring line is always under constant tension. Such a motor may also be used to drive the pinch roll on a rolling mill which is required to pull a strip under a constant tension regardless of changes in speed of the strip as may be determined by other circumstances and conditions. An induction motor whose secondary current is controlled in accordance with an error signal derived from a signal proportional to the horsepower output of the motor and a reference signal will deliver constant horsepower output under varying conditions of load and speeds. An induction motor controlled in this manner finds application, for example, in the operation of coiling long strips of metal on a mandrel under a constant tension. In this operation, the driving motor must increase its torque output and decrease its speed as the radius of the coil builds up on the mandrel, but the horsepower output must not vary if the tension applied to the strip is to remain constant.

Therefore, a principal object of this invention is to provide means for sensing various measures of performance of a dynamoelectric machine and producing electrical signals proportional to the sensed measure of performance. A special object underlying the foregoing object is to provide means for instantaneously multiplying a plurality of pairs of variables and selectively integrating various combinations of the resulting products and various constants and to provide, by such means, a single electrical signal proportional to each of the selectively performed integrations. Another object of the invention is to provide means for sensing and producing such proportional signals which can be used to control the sensed measure of performance of the dynamoelectric machine. A specific object is to provide means for sensing and producing an electrical signal proportional to the torque output of an induction motor. Another specific object is to provide means for sensing and producing an electrical signal proportional to the horsepower output of an induction motor. It is yet another object of my invention to provide a circuit for sensing and producing signals proportional to various measures of performance of an induction motor that is composed entirely of static elements and which produces direct current signals of useable magnitude for operating instruments and/or controlling the performance of the motor.

Briefly, I accomplish the foregoing objects of my invention by sensing properly selected electrical quantities associated with dynamoelectric machine performance by means of semiconductor devices known as "Hall" generators and combining the output signals of the generators with each other or other signals in such a way that they produce a resultant signal that is proportional to the desired measure of performance. Hall generators are devices which display and operate in accordance with a phenomenon known as the "Hall-effect" which specifies that in a conductor carrying a current at right angles to a magnetic field, a charge difference is generated on the surface of the conductor in a direction which is mutually perpendicular to both the field and the current. The generator thus provides a voltage output proportional to the instantaneous product of two quantities; i.e., the current being fed to it and the magnetic field perpendicular to it. The product-proportional output voltage appears across two Hall-effect voltage output electrodes. The current is made to pass through the generator from one to the other of two current input electrodes spaced apart in a direction that will intersect the magnetic field in which the generator is disposed. Two different electrical quantities may be directly and instantaneously multiplied by a Hall generator if one of these electrical quantities is expressed as a current and the other electrical quantity is expressed as a field. If the same electrical quantity is expressed as both a current and as a magnetic field, the Hall output voltage will be proportional to the square of the input parameter. The Hall generator is especially effective with alternating currents since the Hall-effect remains true up to a maximum frequency of from $10^{12}$ to $10^{14}$ cycles.

Thus, for example, through the use of Hall generators whose inputs are furnished with properly selected and expressed electrical quantities and whose outputs are suitably combined with one another and/or other signals, resultant signals may be produced that are proportional to various measures of the output performance of an induction motor.

Other objects and advantages of this invention may best be understood by the following description of a preferred embodiment, reference being made to the drawing which is a circuit diagram of the sensing and signal production networks embodying this invention in association with a wound rotor induction motor and secondary impedance controller.

In the drawing, the motor M whose performance is to be sensed is a conventional wound rotor induction machine having the stator 11 and a rotor 12. Three-phase alternating current power is supplied to the stator 11 by primary conductors 14, 15 and 16, connected to a suitable source of three-phase alternating current. A conventional starting switch 17 and fuses 18 are inserted in the primary conductors. The rotor 12 is connected by means of slip rings in a conventional manner to secondary conductors 20, 21 and 22. Such a circuit arrangement permits the impedance of the secondary or rotor circuit of motor M to be controlled in any one of a number of ways as, for example, by saturable reactors whose output windings are in circuit with the motor secondary. A suitable control circuit is disclosed in my United States Patent No. 2,717,349, issued September 6, 1955. Other suitable circuits are the subject matter of my copending United States Patent applications Serial No. 695,016, filed November 7, 1957, and Serial No. 789,630, filed January 2, 1959. In the drawing, I prefer that the impedance controlling device R be responsive to a single D.C. input signal such as the devices disclosed in the two foregoing pending applications if the signals produced by the circuit of this invention are to be used to control the motor in the manner to be described. As will be seen later, the secondary conductors 20, 21 and 22 also provide a convenient point at which to measure other desired electrical quantities indicative of the performance of the motor and used in the circuit of this invention.

Various components of desired signals are produced by two Hall generator elements 25 and 26 associated with the stator or primary circuits of motor M and a single Hall generator 27 associated with the secondary or rotor circuit of motor M. Hall generator 25 has current input electrodes 30 and 31 and Hall-effect voltage output electrodes 32 and 33; Hall generator 26 has current input electrodes 34 and 35 and Hall-effect output voltage electrodes 36 and 37; and, Hall generator 27 has current input electrodes 38 and 39 and Hall-effect voltage output electrodes 40 and 41.

Hall generator elements 25 and 26 are disposed in a magnetic field produced by and proportional to the input current to the primary circuit 11 of motor M. In order to concentrate and direct the magnetic field perpendicularly to one surface of the Hall generator elements, I place a split C yoke Y of magnetic material about primary phase conductor 16. Hall generator elements 25 and 26 are placed in the air gap of yoke Y so that the magnetic field produced by the current in primary phase conductor 16 is directed perpendicularly to a surface of the generator elements.

Three Y-connected resistors 42, 43 and 44 having their outer terminals connected to the three-phase primary conductors 14, 15 and 16, respectively, provide the current input signal to Hall generator 25. The signal thus provided is a current proportional to the line-to-neutral voltage of phase conductor 16 and is obtained by inserting Hall generator 25 in series with Y-connected resistance 44 so that current input electrodes 30 and 31 are connected between the neutral point $N_1$ of the Y-connected resistance group and the neutral terminal of resistance 44. The current input signal to Hall generator 26 is a signal proportional to the current flowing in phase conductor 16 and is provided by winding 46 inductively associated with primary conductor 16 and having its opposite ends connected to current input electrodes 34 and 35.

Hall generator 27 is disposed in a magnetic field proportional to the current flowing in secondary conductor 22 and produced in a manner similar to the magnetic field associated with the primary circuit with the aid of a second split C yoke Z. The current input signal to Hall generator 27 is provided from three Y-connected resistances 50, 51 and 52 whose outer terminals are connected to secondary conductors 20, 21 and 22, respectively. This current signal is proportional to the line-to-neutral voltage of secondary conductor 22 and is obtained by inserting Hall generator 27 in series with resistance 52 and neutral point $N_2$. This is accomplished by connecting current input electrodes 38 and 39 between neutral $N_2$ and the neutral terminal of resistance 52.

The three Hall generators 25, 26 and 27 each provide a Hall-effect output voltage across their respective output electrodes that is proportional to the instantaneous product of the two electrical values to which their respective inputs are proportionally related in the manner previously dscribed. By means of conductors 54 and 55, the potentials of Hall-effect voltage output electrodes 32 and 33 of Hall generator 25 are made to appear at terminal points A and B, respectively. In like manner, the potentials of Hall-effect voltage output electrodes 36 and 37 of Hall generator 26 are made to appear at terminal points C and D by means of conductors 56 and 57, respectively, and the output potentials of Hall-effect voltage output electrodes 40 and 41 are made to appear at terminal points E and F by means of conductors 58 and 59, respectively. As will be understood from the foregoing description of the circuit, the Hall-effect voltage output of Hall generator 25 appearing at terminal points A and B is proportional to the power input to the primary circuit 11 of motor M. The Hall-effect voltage output appearing between terminal points C and D is proportional to the square of the input current to the primary circuit 11 and thus to the internal losses of the motor. The Hall-effect output voltage appearing between terminal points E and F is proportional to the circuit losses external to the rotor, including the impedance controlling means R.

Another component signal, in addition to those provided by the outputs of the respective voltage generators is provided by a D.C. potential proportional to the no-load losses of the motor M. In the preferred embodiment, the D.C. signal is provided by bridging a potentiometer 62 across primary conductors 15 and 16 by means of conductors 63 and 64. Condensers 65 and 66 are inserted in conductors 63 and 64 between potentiometer 62 and the primary conductors to isolate any D.C. current flowing through potentiometer 62 from the primary conductors. The movable contact 67 of potentiometer 62 is connected to the cathode of rectifier diode 69. That end of potentiometer 62 connected to power main 16 is connected in series with a resistance 70 to the anode of rectifier diode 69, thereby producing a D.C. voltage drop across resistance 70. The amount of current flowing through resistance 70 can be varied by adjustment of the moving contact 67 of potentiometer 62.

In combining the various component signals to produce the ultimately desired signals proportional to the output torque and horsepower of motor M, it is necessary to combine them with due regard to their polarity. The polarity designations of the various terminal points A, B, C, D, E and F represent the polarity of the Hall-effect output voltage electrode to which they are connected with respect to its companion output electrode under a condition of positive power supply to the primary circuit 11 of motor M. The polarity designations of the two ends of resistance 70 are a result of the poling of rectifier diode 69 and remain uneffected by changes in the condition of power supply to motor M. In order to provide a signal voltage proportional to the output torque of motor M, terminal point A, whose polarity is positive with respect to terminal point B, is connected to the positive end of resistance 70. Under conditions of positive power supply to motor M, therefore, the voltage produced by Hall generator 25 and which is instantaneously proportional to the power input to motor M is connected in opposition to the D.C. voltage appearing across resistance 70 which is proportional to the no-load loss of the motor M. By connecting one end of resistance 72 by means of conductor 73 to the negative end of resistance 70 and the other end of resistance 72 by means of conductor 74 to terminal point B, a voltage signal is produced which is instantaneously proportional to the output torque of wound rotor induction motor M. By paralleling a d'Arsonval D.C. instrument $Q_1$ with resistance 72, the signal appearing across resistance 72 and fluctuating at substantially line frequency will indicate the average output torque of motor M. By connecting torque output terminal points $T_1$ and $T_2$ to the input signal terminals $I_1$ and $I_2$ of impedance controller R, the current in the secondary circuit 12 may be controlled in accordance with the output torque of motor M and may be used to provide a constant torque output motor.

A signal proportional to the instantaneous horsepower output of motor M is provided by paralleling a resistance 75 by means of conductors 76 and 77 across terminal points A and F and by connecting terminal points B to C and D to E. This circuit arrangement will integrate the signal proportional to power input to motor M appearing across terminal points A and B, the signal proportional to the internal losses of motor M appearing across terminal points C and D and the signal proportional to the losses external to the secondary circuit including those of the impedance controlling device R appearing across terminal points E and F. It will be noted that under conditions of positive power supply, the polarities of the respective output pairs of the Hall generator producing the three signals involved are of such polarity and are connected in such a manner that those signals proportional to power loss are subtracted from that signal proportional to input power so that the result is a signal proportional to horsepower output.

It is well within the scope of this invention to provide the signal proportional to the instantaneous horsepower output of motor M by combining the Hall-effect output voltages of the three Hall generators 25, 26 and 27 and the D.C. bias voltage appearing across resistor 70. Under conditions of positive power supply, the four signals involved are of such polarity and are connected in such a manner that those signals proportional to power loss are subtracted from the signal proportional to input power. Such a combination of signals is accomplished by connecting the resistance 75 between terminal point F by means of conductor 77 and the negative end of resistance 70 as, for example, by connecting conductor 76 to conductor 73 as shown by the broken line 78 in the circuit drawing. When resistance 75 is connected in the manner just described, conductor 76 is, of course, not connected to terminal point A.

A d'Arsonval D.C. instrument $Q_2$ may be paralleled with resistance 75 to indicate the average horsepower output as represented by the fluctuating voltage signal appearing across resistor 75. Terminal points $H_1$ and $H_2$, connected to opposite ends, respectively, of resistance 75, may be connected to input terminals $I_1$ and $I_2$ of impedance controller R to control the current in the secondary circuit 12 of motor M in accordance with the horsepower output of the motor.

It will be noted that the circuit of this invention provides means for instantaneously, algebraically combining or integrating signals having differing and varying frequencies. For example, the signals appearing across the terminal pairs A—B and C—D fluctuate at approximately line frequency and the signal appearing across terminal pair E—F fluctuates at the widely varying frequency of the secondary circuit of the motor, while the signal appearing across resistance 70 is a unidirectional signal.

It is to be understood that the sensing, indicating and control circuit as shown in the drawings and as described above in connection with the three-phase wound rotor induction motor assumes that the three primary and secondary phases are balanced with equal current flowing in each of the three phases thereof. If the phase loadings are unbalanced, a second set of three Hall generators should be used in the second phase of the motor primary and secondary in the same manner as Hall generators 25, 26 and 27 with the Hall-effect voltage outputs of the respective Hall generators associated with the two phases connected in parallel.

From the foregoing description of the circuit of this invention and its operation, it will be seen that means is provided thereby to produce, with a minimum number of static electrical components, useable signals proportional to the output torque and the output horsepower of a wound rotor induction motor and which signals may be used to control the secondary current of such a motor through an impedance controlling device responsive to a D.C. controlling input signal. It will also be understood that in order to produce these signals, the invention accomplishes the instantaneous algebraic addition or integration of a plurality of signals representing the instantaneous product of continuously variable values which may even be varying at different frequencies as are encountered in the currents and voltages of the primary and the secondary of a wound rotor induction motor.

Those skilled in the art will appreciate that various changes and modifications can be made in the preferred form of apparatus described herein without departing from the spirit and scope of the invention.

I claim:
1. In an electrical system for producing a signal proportional to instantaneous output torque and horsepower of a wound rotor induction motor having a polyphase primary circuit energized from a polyphase power source and a polyphase secondary circuit, the combination of a first Hall generator disposed in a first magnetic field proportional to instantaneous input current to said primary of said motor and conducting a current proportional to instantaneous input voltage to said primary of said motor in a direction intersecting said first magnetic field and having a pair of Hall-effect voltage output electrodes, a second Hall generator disposed in said first magnetic field and conducting a current proportional to instantaneous input current to said primary of said motor in a direction intersecting said first magnetic field and having a pair of Hall-effect voltage output electrodes, a third Hall generator disposed in a second magnetic field proportional to instantaneous secondary current of said motor and conducting a current proportional to instantaneous secondary voltage in a direction intersecting said second magnetic field and having a pair of Hall-effect voltage output electrodes, first resistance means, a source of direct current proportional to the no-load losses of said motor connected in parallel with said first resistance, said first resistance means and said Hall-effect voltage outputs of said first, second and third Hall generators connected in series so that under conditions of positive power supply to said motor, the voltage across said first resistance and said Hall-effect voltage outputs of said second and third Hall generators are connected in polarity addition with respect to each other and in polarity opposition with respect to said Hall-effect voltage output of said first Hall generator, a second resistance means connected across said first resistance and said Hall-effect voltage output electrodes of said first Hall generator whereby a combined voltage signal appears across said second resistance proportional to the instantaneous output torque of said motor, a third resistance means connected across said Hall-effect voltage outputs of said first, second and third Hall generators whereby a combined voltage signal appears across said third resistance proportional to the instantaneous output horsepower of said motor.

2. In an electrical system for producing a signal proportional to instantaneous output torque of a wound rotor induction motor having a polyphase primary circuit energized from a polyphase power source and a polyphase secondary circuit, the combination of a Hall generator disposed in a first magnetic field proportional to instantaneous input current to said primary of said motor and conducting a current proportional to instantaneous input voltage to said primary of said motor in a direction intersecting said first magnetic field and having a pair of Hall-effect voltage output electrodes, first resistance means, a source of direct current proportional to the no-load losses of said motor connected in parallel with said first resistance, said first resistance means and said Hall-effect voltage output electrode of said first Hall generator connected in series so that under conditions of positive power supply to said motor, the voltage across said first resistance is in polarity opposition to the voltage across said Hall-effect voltage output electrodes of said Hall generator, a second resistance means connected across said series connected first resistance and said Hall-effect voltage output whereby a voltage signal appears across said second resistance proportional to the instantaneous output torque of said motor.

3. In an electrical system for producing a signal proportional to instantaneous output horsepower of a wound rotor induction motor having a polyphase primary circuit energized from a polyphase powder source and a polyphase secondary circuit, the combination of a first Hall generator disposed in a first magnetic field proportional to instantaneous input current to said primary of said motor and conducting a current proportional to instantaneous input voltage to said primary of said motor in a direction intersecting said first magnetic field and having a pair of Hall-effect voltage output electrodes, a second Hall generator disposed in said first magnetic field and conducting a current proportional to instantaneous input current to said primary of said motor in a direction intersecting said first magnetic field and having a pair of Hall-effect voltage output electrodes, a third Hall generator disposed in a second magnetic field proportional to instantaneous secondary current of said motor and conducting a current proportional to instantaneous secondary voltage in a direction intersecting said second magnetic field and having a pair of output electrodes, said Hall-effect voltage output electrodes of said first, second and third Hall generators connected in series so that under conditions of positive power supply to said motor, said Hall-effect voltage outputs of said second and third Hall generators are connected in polarity addition with respect to each other and in polarity oppositon with respect to said Hall-effect voltage output of said first Hall generator, a resistance means connected across said series connected Hall-effect voltage output electrodes of said first, second and third Hall generators whereby a voltage signal appears across said resistance proportional to the instantaneous output horsepower of said motor.

4. In an electrical system for producing a signal proportional to instantaneous output torque and horsepower of a wound rotor induction motor having a polyphase primary circuit energized from a polyphase power source and a polyphase secondary circuit, the combination of means for providing a first magnetic field proportional to the current in one phase of said motor primary circuit, first and second sensing elements disposed in said first magnetic field and each having two current input electrodes spaced apart in a direction intersecting said first magnetic field and each having two Hall-effect voltage output electrodes, means associated with said polyphase motor primary and connected to said current input electrodes of said first sensing element for passing a current proportional to the line-to-neutral voltage of said one phase of said motor secondary circuit through said first sensing element, means associated with said one phase of said motor primary circuit and connected to said current input electrodes of said second sensing element for passing a current proportional to the current in said one phase of said motor primary circuit, means for providing a second magnetic field proportional to the current in one phase of said motor secondary circuit, a third sensing element disposed in said second magnetic field and having two current input electrodes spaced apart in a direction intersecting said second magnetic field and having two Hall-effect voltage output electrodes, means associated with one phase of said motor secondary circuit and connected to said current input electrodes of said third sensing element for passing a current proportional to the line-to-neutral voltage of said one phase of said motor secondary circuit through said sensing element, first resistance means, a source of direct current proportional to the no-load losses of said motor connected in parallel with said first resistance, said first resistance means and said Hall-effect voltage output electrodes of said first, second and third sensing elements connected in series so that under conditions of positive power supply to said motor, said first resistance is connected to and in polarity opposition with respect to one of said Hall-effect voltage output electrodes of said first sensing element and said Hall-effect voltage output electrodes of said second and third sensing elements are serially connected in polarity addition to each other and in polarity opposition to the other of said Hall-effect voltage output electrodes of said first sensing element, a second resistance means connected across said series connected first resistance and said Hall-effect voltage output electrodes of said first sensing element whereby a voltage signal appears across said second resistance proportional to the instantaneous output torque of said motor, a third resistance means connected across said series connected first, second and third Hall-effect voltage output electrodes whereby a voltage signal appears across said third resistance proportional to the instantaneous output horsepower of said motor.

5. In an electrical system for producing a signal proportional to instantaneous output torque of a wound rotor induction motor having a polyphase primary circuit energized from a polyphase power source and a polyphase secondary circuit, the combination of means for providing a magnetic field proportional to the current in one phase of said motor primary circuit, a sensing element disposed in said magnetic field and having two current input electrodes spaced apart in a direction intersecting said magnetic field and having two Hall-effect voltage output electrodes, means associated with said polyphase motor primary and connected to said current input electrodes of said sensing element for passing a current proportional to the line-to-neutral voltage of said one phase of said motor secondary circuit through said sensing element, first resistance means, a source of direct current proportional to the no-load losses of said motor connected in parallel with said first resistance, said first resistance means and said Hall-effect voltage output electrodes of said sensing element connected in series so that under conditions of positive power supply to said motor, the voltage across said first resistance is in polarity opposition to the voltage across said Hall-effect voltage output electrodes of said sensing element, a second resistance means connected across said series connected first resistance and said Hall-effect voltage output whereby a voltage signal appears across said second resistance proportional to the instantaneous output torque of said motor.

6. In an electrical system for producing a signal proportional to instantaneous output horsepower of a wound rotor induction motor having a polyphase primary circuit energized from a polyphase power source and a polyphase secondary circuit, the combination of means for providing a first magnetic field proportional to the current in one phase of said motor primary circuit, first and second sensing elements disposed in said first magnetic field and each having two current input electrodes spaced apart in a direction intersecting said first magnetic field and each having two Hall-effect voltage output electrodes, means associated with said polyphase motor primary and connected to said current input electrodes of said first sensing element for passing a current proportional to the line-to-neutral voltage of said one phase of said motor primary circuit through said first sensing elements, means associated with said one phase of said motor primary circuit and connected to said current input electrodes of said second sensing element for passing a current proportional to the current in said one phase of said motor primary circuit, means for providing a second magnetic field proportional to the current in one phase of said motor secondary circuit, a third sensing element disposed in said second magnetic field and having two current input electrodes spaced apart in a direction intersecting said second magnetic field and having two Hall-effect voltage output electrodes, means associated with one phase of said motor secondary circuit and connected to said current input electrodes of said third sensing element for passing a current proportional to the line-to-neutral voltage of said one phase of said motor secondary circuit through said third sensing element, said Hall-effect voltage output electrodes of said first, second and third sensing elements connected in series so that under conditions of positive power supply to said motor, said Hall-effect voltage outputs of said second and third sensing elements are connected in polarity addition with respect to each other and in polarity opposition with respect to said Hall-effect voltage output of said first sensing element, a resistance means connected across said series connected first, second and third Hall-effect voltage output electrodes whereby a voltage signal appears across said resistance proportional to the instantaneous output horsepower of said motor.

7. Apparatus for controlling the secondary current of a wound rotor induction motor in accordance with various criteria of output performance of said motor, said motor having a polyphase primary circuit energized from a polyphase power source and a polyphase secondary circuit, said apparatus comprising impedance controlling means in circuit with said secondary circuit and responsive to a D.C. signal for varying the impedance of said secondary circuit, a first Hall generator disposed in a first magnetic field proportional to instantaneous input current to said primary of said motor and conducting a current proportional to instantaneous input voltage to said primary of said motor in a direction intersecting said first magnetic field and having a pair of Hall-effect voltage output electrodes, a second Hall generator disposed in said first magnetic field and conducting a current proportional to instantaneous input current to said primary of said motor in a direction intersecting said first magnetic field and having a pair of Hall-effect output electrodes, a third Hall generator disposed in a second magnetic field proportional to instantaneous secondary current of said motor and conducting a current proportional to instantaneous secondary voltage in a direction intersecting said second magnetic field and having a pair of output electrodes, first resistance means, a source of direct current proportional to the no-load losses of said motor connected in parallel with said first resistance, said first resistance means and said Hall-effect voltage output electrodes of said first, second and third Hall generators connected in series so that under conditions of positive power supply to said motor, one end of said first resistance is connected to and in polarity opposition with respect to one of said Hall-effect voltage output electrodes of said first Hall generator and said Hall-effect voltage outputs of said second and third Hall generators are serially connected in polarity addition to each other and in polarity opposition to the other of said Hall-effect voltage output electrodes of said first Hall generator, a second resistance means connected between the other end of said first resistance and the other of said Hall-effect voltage output electrodes of said first Hall generator across said series connected first resistance and said Hall-effect voltage output electrodes of said first Hall generator whereby a combined voltage signal appears across said second resistance proportional to the instantaneous output torque of said motor which may be employed as a D.C. input signal for said impedance controlling means to control the secondary current of said motor in accordance with its torque output, a third resistance means connected across said Hall-effect voltage outputs of said first, second and third Hall generators whereby a combined voltage signal appears across said third resistance proportional to the instantaneous output horsepower of said motor and which may be employed as a D.C. input signal for said impedance controlling means to control the secondary current of said motor in accordance with its horsepower.

8. Apparatus for controlling the secondary current of a wound rotor induction motor in accordance with the output torque of said motor, said motor having a polyphase primary circuit energized from a polyphase power source and a polyphase secondary circuit, said apparatus comprising impedance controlling means in circuit with said secondary circuit and responsive to a D.C. signal for varying the impedance of said secondary circuit, a Hall generator disposed in a magnetic field proportional to instantaneous input current to said primary of said motor and conducting a current proportional to instantaneous input voltage to said primary of said motor in a direction intersecting said magnetic field and having a pair of Hall-effect voltage output electrodes, first resistance means, a source of direct current proportional to the no-load losses of said motor connected in parallel with said first resistance, said first resistance means and said Hall-effect voltage output electrodes of said Hall generator connected in series so that under conditions of positive power supply to said motor, one end of said first resistance is connected to and in polarity opposition with respect to one of said Hall-effect voltage output electrodes of said Hall generator, a second resistance means connected between the other end of said first resistance and the other of said Hall-effect voltage output electrodes of said Hall generator in parallel with said series connected first resistance and said Hall-effect voltage output electrodes of said Hall generator whereby a combined voltage signal appears across said second resistance proportional to the instantaneous output torque of said motor and which may be employed as a D.C. input signal for said impedance controlling means to control the secondary current of said motor in accordance with its torque output.

9. Apparatus for controlling the secondary current of a wound rotor induction motor in accordance with the output horsepower of said motor, said motor having a polyphase primary circuit energized from a polyphase power source and a polyphase secondary circuit, said apparatus comprising impedance controlling means in circuit with said secondary circuit and responsive to a D.C. signal for varying the impedance of said secondary circuit, a first Hall generator disposed in a first magnetic field proportional to instantaneous input current to said primary of said motor and conducting a current proportional to instantaneous input voltage to said primary of said motor in a direction intersecting said first magnetic field and having a pair of Hall-effect voltage output electrodes, a second Hall generator disposed in said first magnetic field and conducting a current proportional to instantaneous input current to said primary of said motor in a direction intersecting said first magnetic field and having a pair of Hall-effect output electrodes, a third Hall generator disposed in a second magnetic field proportional to instantaneous secondary current of said motor and conducting a current proportional to instantaneous secondary voltage in a direction intersecting said second magnetic field and having a pair of output electrodes, said Hall-effect voltage output electrodes of said first, second and third Hall generators connected in series so that under conditions of positive power supply to said motor said Hall-effect voltage outputs of said second and third Hall generators are arranged in polarity addition to each other and in polarity opposition to said Hall-effect voltage output of said first Hall generator, a resistance means connected across said Hall-effect voltage outputs of said first, second and third Hall generators whereby a combined voltage signal appears across said resistance proportional to the instantaneous output horsepower of said motor and which may be employed as a D.C. input signal for said impedance controlling means to control the secondary current of said motor in accordance with its horsepower output.

10. Apparatus for producing an electrical signal proportional to the output torque of an induction motor comprising a Hall generator having an input proportional to the primary voltage of said motor and an input proportional to the primary current of said motor and an output signal proportional to the product of the two input signals, a source of D.C. potential proportional to the no-load losses of said motor, circuit means including an impedance for algebraically combining the output signal of said Hall generator and said D.C. potential whereby a single electrical signal appears across said impedance proportional to the output of said motor.

11. Apparatus for producing an electrical signal proportional to the output horsepower of an induction motor comprising a first Hall generator having an input proportional to the primary voltage of said motor and an input proportional to the primary current of said motor and an output signal proportional to the product of the two input signals, a second Hall generator having two inputs both proportional to the primary current of said motor and an output proportional to the square of the input current to said motor, a third Hall generator having an input proportional to the secondary voltage of said motor and an input proportional to the secondary current of said motor and an output proportional to the product of the two input signals, circuit means including an impedance for algebraically combining the outputs of said first, second and third Hall generators whereby a single electrical signal appears across said impedance proportional to the output of said motor.

12. Apparatus for producing an electrical signal proportional to the output horsepower of an induction motor comprising a first Hall generator having an input proportional to the primary voltage of said motor and an input proportional to the primary current of said motor and an output signal proportional to the product of the two input signals, a second Hall generator having two inputs both proportional to the primary current of said motor and an output proportional to the square of the input current to said motor, a third Hall generator having an input proportional to the secondary voltage of said motor and an input proportional to the secondary current of said motor and an output proportional to the product of the two input signals, a source of D.C. potential proportional to the no-load losses of said motor, circuit means including an impedance for algebraically combining the outputs of said first, second and third Hall generators and said D.C. potential whereby a single electrical signal appears across said impedance proportional to the output of said motor.

13. In an electrical system for producing a signal proportional to torque of a wound rotor induction motor having a polyphase primary circuit energized from a polyphase power source and a polyphase secondary circuit, a Hall generator disposed in a first magnetic field proportional to instantaneous input current to said primary of said motor and conducting a current proportional to instantaneous input voltage to said primary of said motor in a direction intersecting said first magnetic field and having a pair of Hall-effect voltage output electrodes, a resistance means connected across the Hall-effect voltage output electrodes whereby a voltage signal appears across said resistance means proportional to torque.

References Cited in the file of this patent
UNITED STATES PATENTS
2,754,464   Wizenez et al. _____ July 10, 1956